（12）United States Patent
Tonami et al.

(10) Patent No.: US 7,613,931 B2
(45) Date of Patent: Nov. 3, 2009

(54) COPY PROTECTION METHOD AND SYSTEM FOR PROGRAMMABLE GATE ARRAY

(75) Inventors: Masahiro Tonami, Kawasaki (JP); Kozaburo Nakamura, Osaka (JP); Atsushi Kondo, Osaka (JP); Shigeaki Funaki, Osaka (JP); Koji Yasuda, Osaka (JP)

(73) Assignees: NEC Electronics Corporation, Kanagawa (JP); Mikasa Shoji Co., Ltd., Osaka (JP)

( * ) Notice: Subject to any disclaimer, the term of this patent is extended or adjusted under 35 U.S.C. 154(b) by 802 days.

(21) Appl. No.: 11/186,967

(22) Filed: Jul. 22, 2005

(65) Prior Publication Data

US 2006/0020907 A1 Jan. 26, 2006

(30) Foreign Application Priority Data

Jul. 23, 2004 (JP) .............................. 2004-215904
May 23, 2005 (JP) .............................. 2005-149178

(51) Int. Cl.
G06F 11/30 (2006.01)

(52) U.S. Cl. ...................... 713/189; 717/100; 380/201; 713/193; 713/1

(58) Field of Classification Search ...................... None
See application file for complete search history.

(56) References Cited

U.S. PATENT DOCUMENTS 6,362,649 B1 * 3/2002 McGowan ................... 326/41
7,162,644 B1 * 1/2007 Trimberger ................ 713/189

FOREIGN PATENT DOCUMENTS

| JP | 2001-325153 A | 11/2001 |
| JP | 2002-50956 A | 2/2002 |
| JP | 2003-84853 A | 3/2003 |
| JP | 2004-7472 A | 1/2004 |
| JP | 2004-505534 A | 2/2004 |
| JP | 2004-70556 A | 3/2004 |

* cited by examiner

Primary Examiner—David García Cervetti
Assistant Examiner—Fikremariam Yalew
(74) Attorney, Agent, or Firm—Sughrue Mion, PLLC (57) ABSTRACT

The present invention relates to a programmable-gate-array copy protection method and a system which prevent unauthorized copying of an FPGA program. A copy protection method for a field-programmable gate array, the method comprising a step of causing a user-specific gate array to boot a user circuit data to the field-programmable gate array, the user-specific gate array being connected to the field-programmable gate array and a memory device in which the user circuit data is stored and being pre-programmed at a semiconductor-vender's factory.

15 Claims, 12 Drawing Sheets

COPY PROTECTION METHOD AND SYSTEM FOR PROGRAMMABLE GATE ARRAY

This application claims priority to prior Japanese patent applications JP 2004-215904 and JP 2005-149178, the disclosures of which are incorporated herein by reference.

BACKGROUND OF THE INVENTION

1. Field of the Invention

The present invention generally relates to systems having field-programmable gate arrays (FPGAs) and, more particularly, to a programmable-gate-array copy protection method and a system which prevent unauthorized copying of an FPGA program.

2. Description of the Related Art

An optimum method for developing and mass-producing a system for a short period of time is to employ an FPGA that allows a user to change the internal circuit to a user circuit by programming. FPGAs are increasingly becoming widespread on the market. However, as the market expands, systems copied without authority are also found. Reasons behind the scene are that FPGAs are readily available from suppliers/venders and ROMs (read-only memories) in which FPGA programs are stored are also easily copied using ROM writers.

As a copy-protection technology for the FPGAs, patent documents described below have been proposed. In the related technologies, a program and so on are encrypted and transmitted and the encrypted program is decrypted, thereby preventing unauthorized copying.

Figure 13:
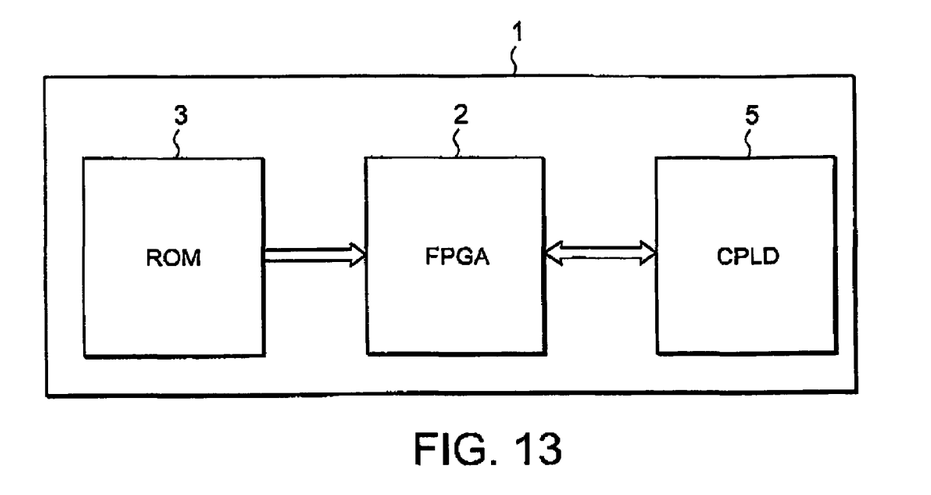
FIG. 13 is a block diagram showing a first known example.
Figure 14:
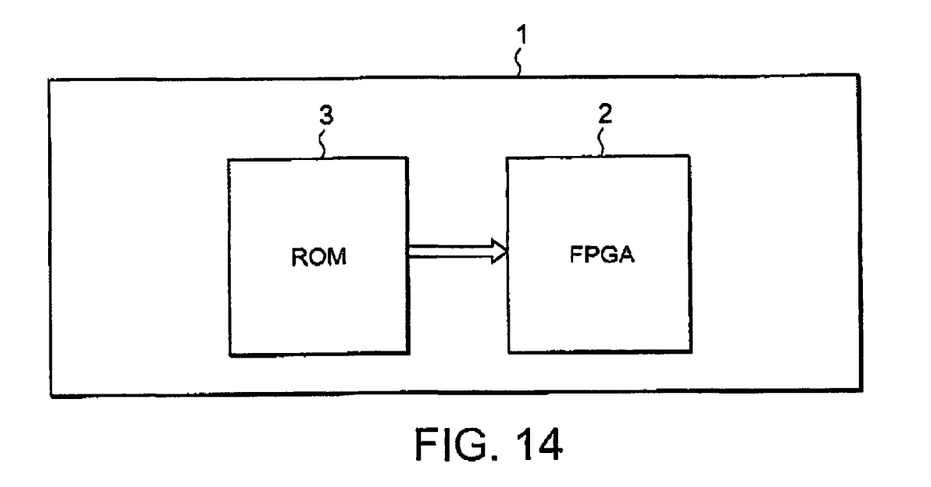
FIG. 14 is a block diagram showing a second known example.

A system having an FPGA includes, at least, an FPGA and a ROM in which the FPGA program is stored. FIGS. 13 and 14 are block diagrams illustrating copy protection of the related art.

As shown in FIG. 13, Japanese Unexamined Patent Application Publication No. 2003-84853 discloses a system that includes an FPGA 2, a ROM 3 in which an FPGA program is stored, and a complex programmable logic device (CPLD) 5. The CPLD 5 is an integral component for copy protection and that is pre-programmed at a factory. The feature of this arrangement is that the CPLD 5 is connected to only the FPGA 2 but is not connected to the ROM 3 in which the FPGA program is stored.

The CPLD 5 transmits encrypted initial-state data to the FPGA 2, which then decrypts the initial-state data and performs comparison/determination to restrict the operation, thereby preventing unauthorized copying of the system.

As shown in FIG. 14, Japanese Unexamined Patent Application Publication No. 2001-325153 also discloses a system that includes an FPGA 2 and a ROM 3 in which an FPGA program is stored. In this system, a ROM program in which the FPGA program is stored is encrypted and is transmitted to the FPGA 2 and the FPGA 2 decrypts the encrypted program, thereby preventing unauthorized copying.

However, in those related technologies, the ROM program or initial-state data is encrypted and is transmitted to the FPGA and the FPGA decrypts the program or data, thereby protecting unauthorized copying. That is, since the FPGA performs decryption processing and determination processing, purchasing an FPGA having the same decoding function can make an unauthorized copy.

SUMMARY OF THE INVENTION

Accordingly, an object of the present invention is to provide a copy protection method and a system which do not permit unauthorized copying, with respect to a system having an FPGA.

The present invention provides a copy protection method for a field-programmable gate array (FPGA). The method includes a step of causing a user-specific gate array (GA) to boot a user circuit data to the FPGA The user-specific GA is connected to the FPGA and a memory device in which the user circuit data is stored.

The present invention provides a system that includes an FPGA, a memory device in which user circuit data is stored, and a user-specific GA connected to the FPGA and the memory device. The user-specific GA includes a first boot circuit for booting the user circuit data to the FPGA.

In the present invention, a read-only memory (ROM) is used as a representative memory device. Therefore, in following explanations, a ROM has a meaning the same as a memory device. The user-specific GA is arranged and connected to the FPGA, which can be programmed by a user, and to the ROM in which the user circuit data (i.e., an FPGA program). The user-specific GA, which is pre-programmed at a semiconductor-vender's factory, controls a function for booting the FPGA program from the ROM in which the FPGA program is stored. More specifically, the present invention employs a scheme in which a control line that is required for the configuration of the FPGA and that provides a connection between the FPGA and the ROM is controlled so that the GA appears as an FPGA when viewed from the ROM and the GA appears as a ROM when viewed from the FPGA.

In this manner, the arrangement of the GA between the FPGA and the ROM allows an operation required for GA copy protection to be performed from the boot stage. Also, a user who does not have a GA pre-programmed at a semiconductor-vender's factory cannot even boot an FPGA program from the ROM in which the FPGA program is stored. That is, even when a person who has obtained components, such as an FPGA, that constitute a system, and has successively copied an ROM chip in which an FPGA program is stored, he or she cannot even boot the FPGA program from the ROM in which the FPGA program is stored. That is, the present invention provides an advantage in that a person who does not have a GA pre-programmed at a semiconductor-vender's factory cannot copy the system.

DESCRIPTION OF THE PREFERRED EMBODIMENT

An embodiment of the present invention will be described below in detail with reference to the accompanying drawings.

Embodiment

Figure 1:
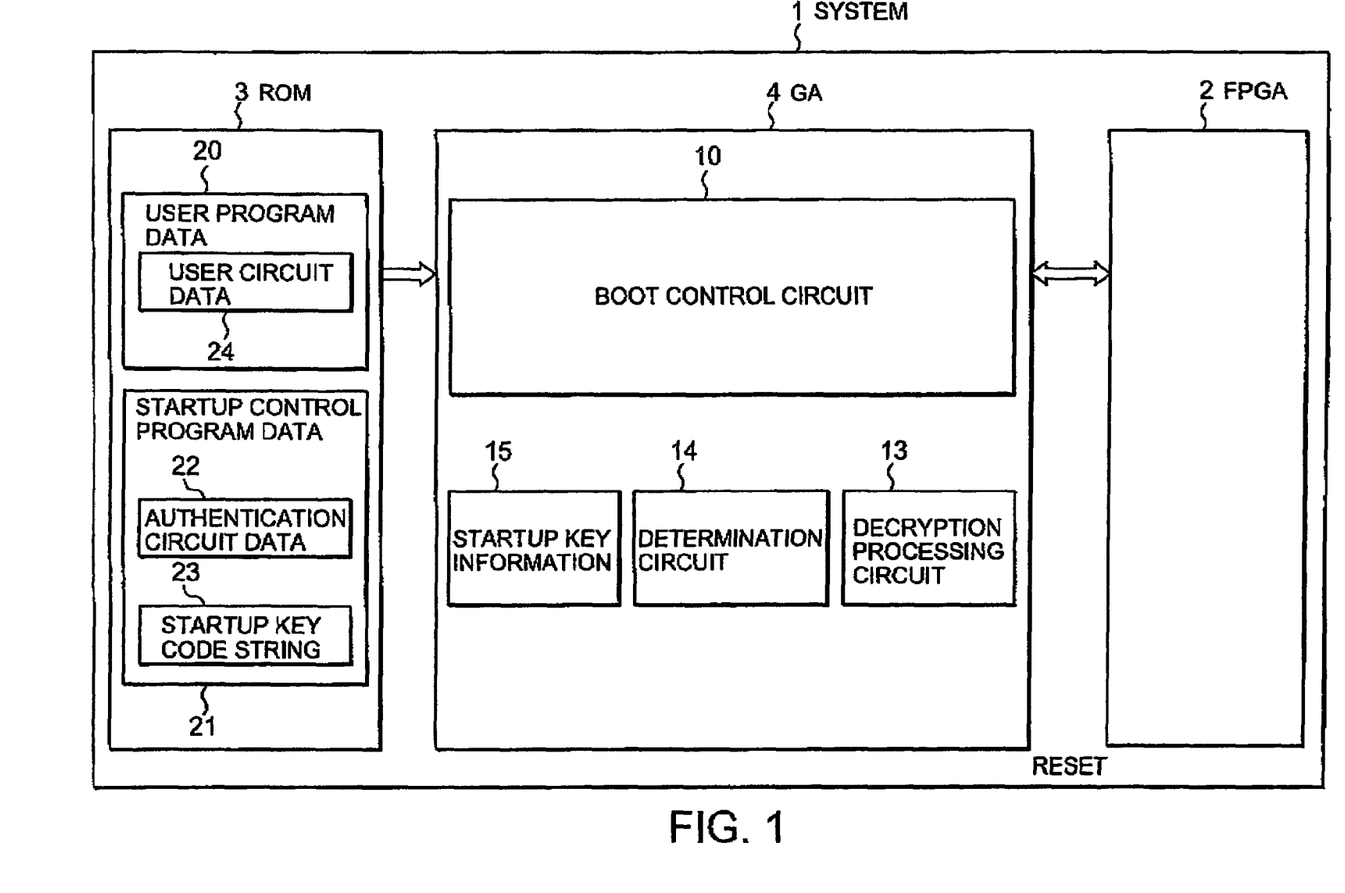
FIG. 1 is a basic block diagram of the present invention.

FIG. 1 shows an embodiment of the present invention. A system 1 includes a field-programmable gate array (FPGA) 2, a gate array (GA) 4, and a read-only memory (ROM) 3. The FPGA 2 is a general-purpose gate array and a user can change the internal logic thereof by using a program. The GA 4 is a user-specific gate array that is pre-programmed at a semiconductor-vendees factory. The memory device comprises the ROM 3 that stores user circuit data (which is also referred to as an "FPGA program") for changing the logic circuit of the FPGA 2 to a circuit desired by the user.

The GA 4 is disposed between the ROM 3 and the FPGA 2 to control a function for booting the user circuit data from the ROM 3 to the FPGA 2.

The GA 4 includes a boot control circuit 10, a decryption processing circuit 13, a determination circuit 14, and startup key information 15. The ROM 3 contains user program data 20 and startup control program data 21. The user program data 20 stores user circuit data 24 and the startup control program data 21 contains authentication circuit data 22 and a startup key code string 23, which is obtained by encrypting a predetermined startup key with a private encryption key.

When this system is powered on, the GA 4 receives the startup control program data 21, which contains the authentication circuit data 22 and the encrypted startup key code string 23, from the ROM 3 and boots the startup control program data 21 to the FPGA 2. When the boot is completed, an authentication circuit is generated in the FPGA 2 in accordance with the authentication circuit data 22. The generated authentication circuit sends the startup key code string, transmitted from the ROM 3, to the GA 4. The encryption processing circuit 13 in the GA 4 decrypts the startup key code string, sends the decryption result to the determination circuit 14. The determination circuit 14 performs determination by comparing the decryption result with the predetermined startup key information 15.

Upon determining that the decryption result is correct, the determination circuit 14 operates the boot control circuit 10 to boot the user circuit data. When the boot is completed, a user circuit is generated in the FPGA 2. On the other hand, as a result of the determination by comparing the decryption result with the predetermined startup key information, when the determination circuit 14 determines that the decryption result is incorrect, the boot control circuit 10 resets the FPGA 2.

The user-specific GA 4 is disposed between the FPGA 2 and the ROM 3, which stores user circuit data (also referred to as an "FPGA program"), to perform determination on the startup key code string. After confirming that the determination result is correct, the user circuit data is booted. With respect to a person who has correct startup key information, the user circuit operates property. However, with respect to a person who does not have startup key information or who has incorrect startup key information, the user circuit does not operate. That is, only a person who has a user-specific GA with correct startup key information is permitted to operate the system. For any other person, the system does not operate. In other words, since any person who attempts to copy the system without authority cannot obtain the user-specific GA, he or she cannot make a copy.

FIRST EXAMPLE

Figure 2:
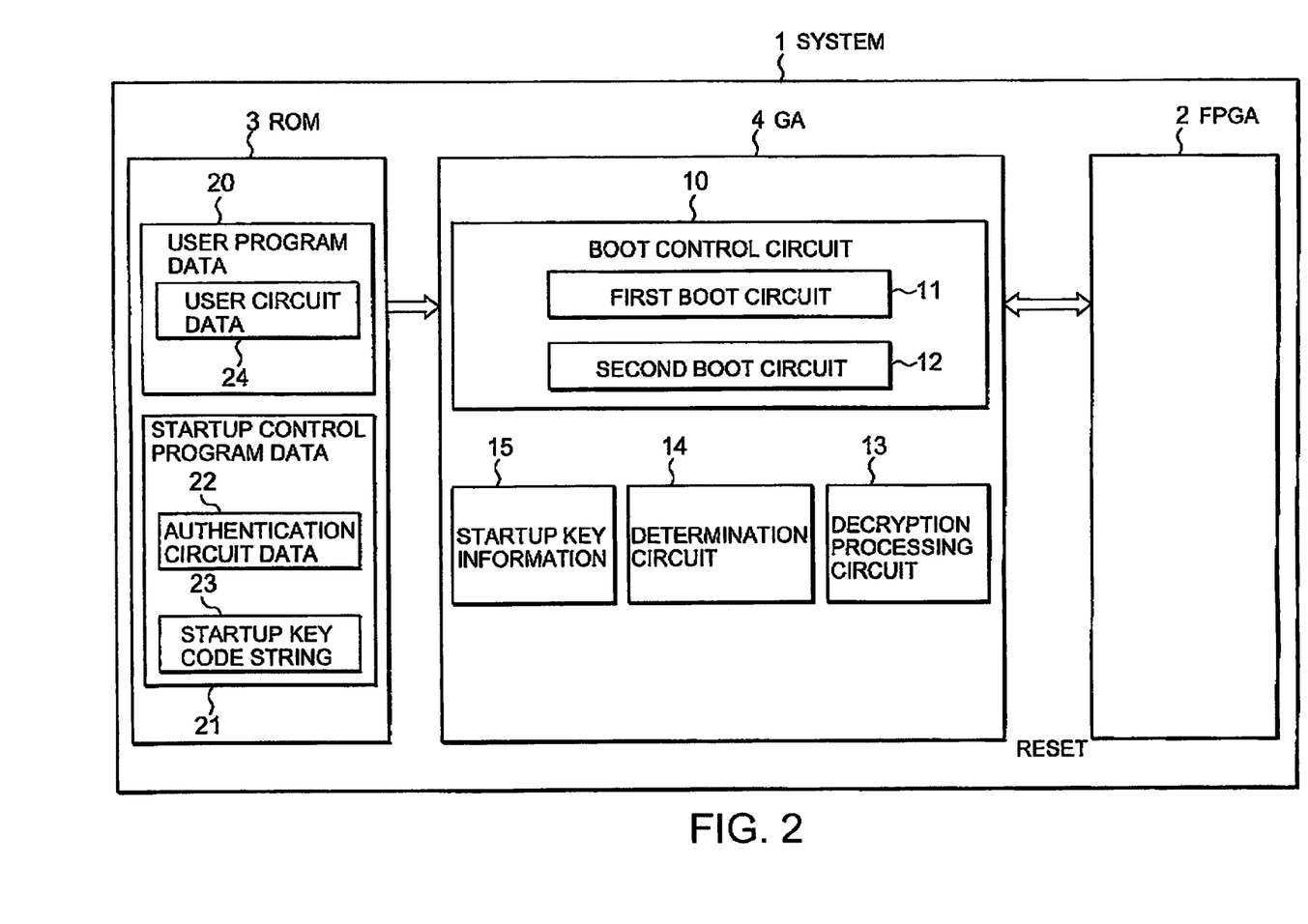
FIG. 2 is a block diagram of a first example of the present invention.
Figure 3:
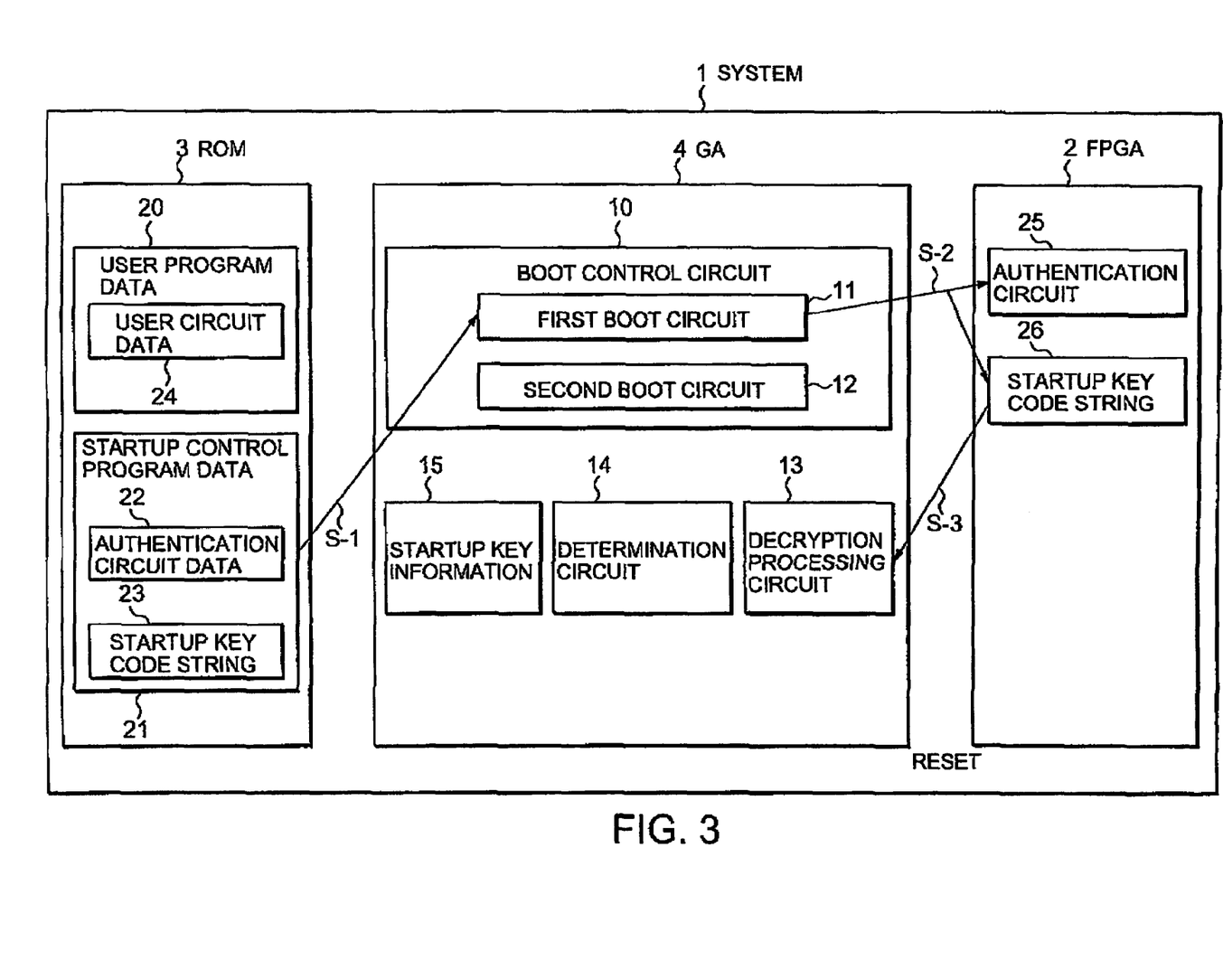
FIG. 3 is a diagram illustrating the operation of the first example.
Figure 4:
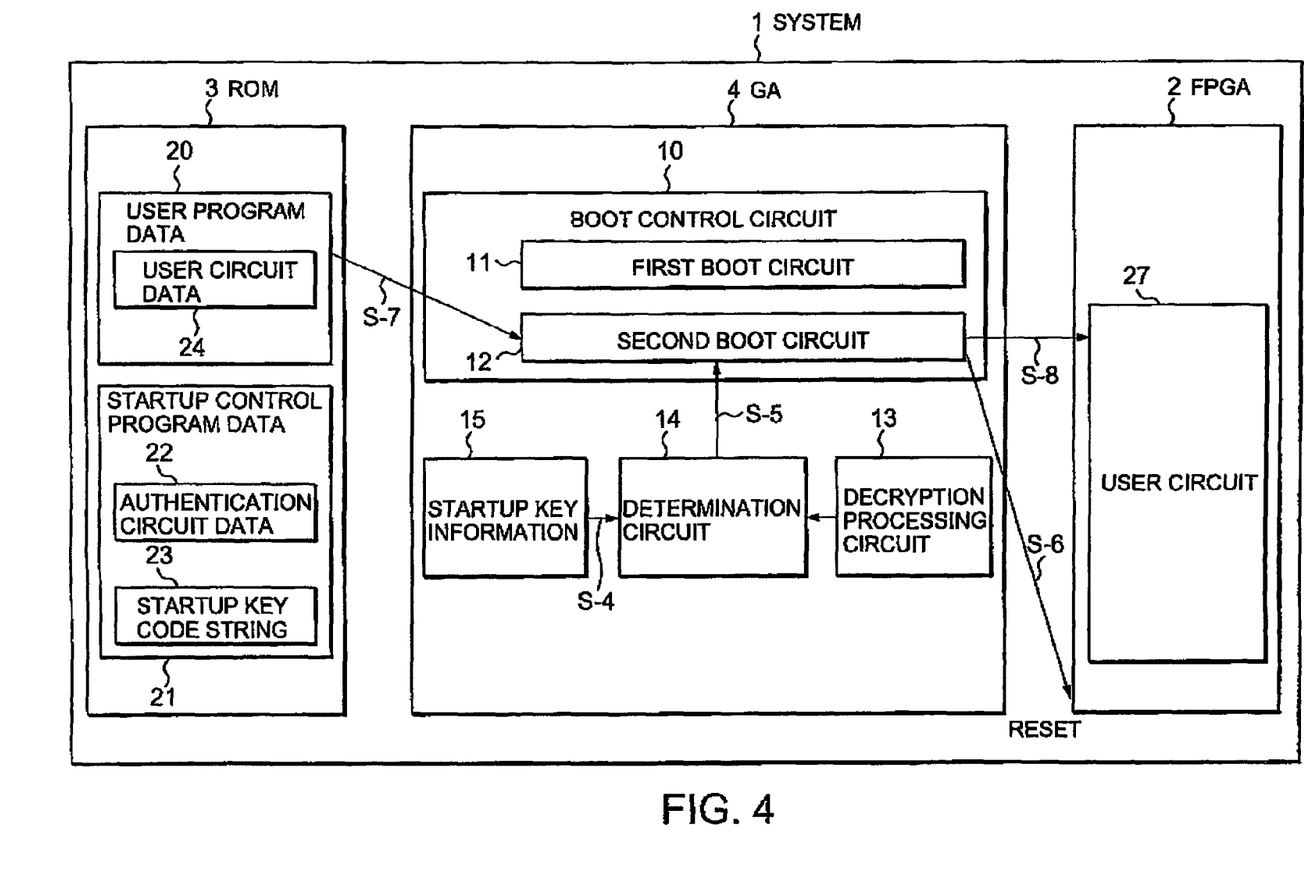
FIG. 4 is a diagram illustrating the operation of the first example.
Figure 5:
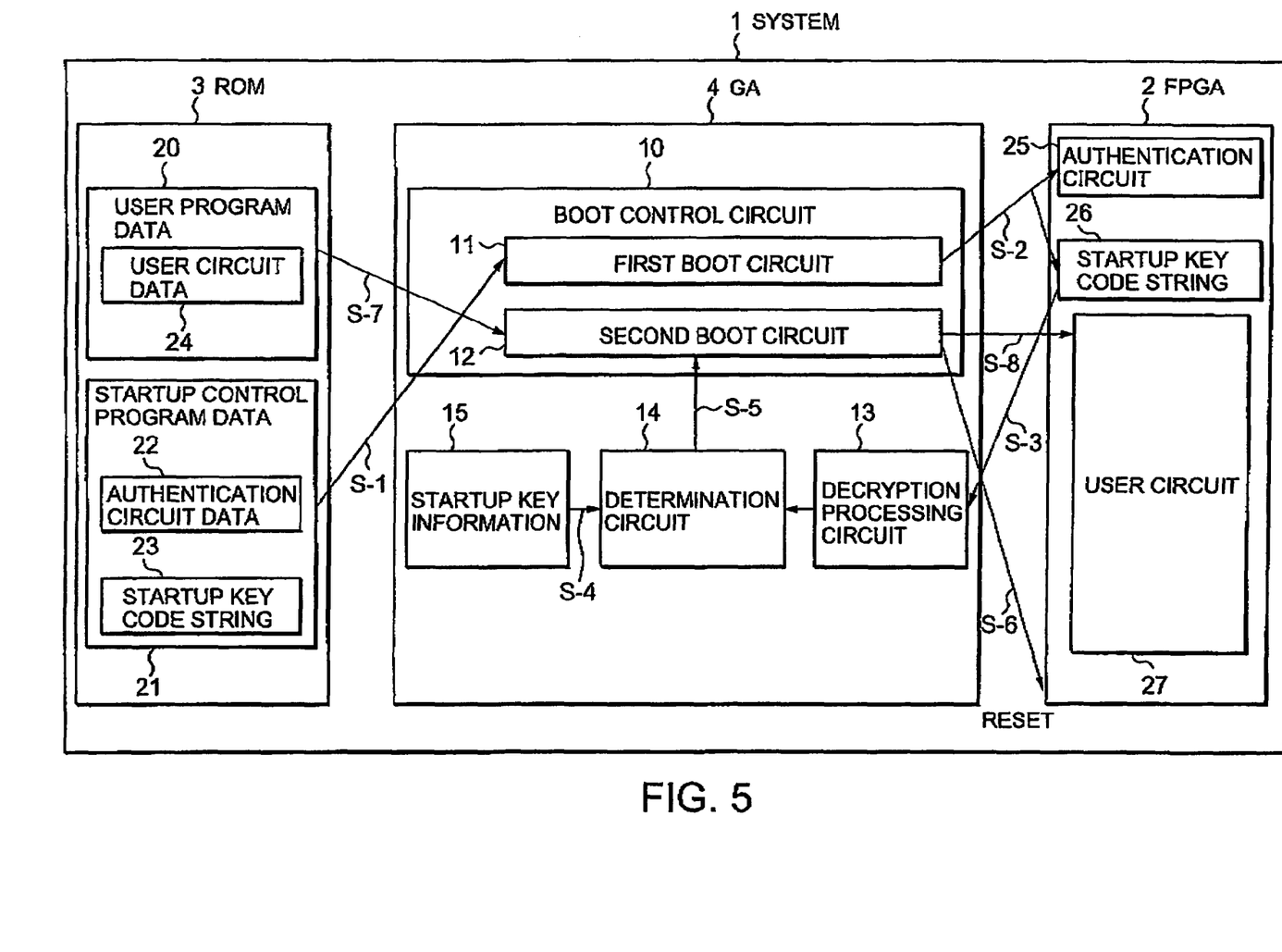
FIG. 5 is a diagram illustrating the operation of the first example.

The configuration of a first example of the present invention will be described in detail with reference to FIGS. 2 to 5. FIG. 2 is a block diagram of the first example and FIGS. 3, 4, and 5 illustrate operation steps in this example.

As shown in FIG. 2, a system 1 in the first example includes an FPGA 2, a GA 4, and a ROM 3.

The FPGA 2 is a general-purpose gate array having an internal logic circuit that a user can change using a program. The GA 4 is a user-specific gate array that is pre-programmed at a semiconductor-vender's factory. A memory device comprises the ROM 3 that stores user circuit data (which is also referred to as an "FPGA program") 24 for changing the logic circuit of the FPGA 2 to a circuit desired by the user.

The GA 4 is disposed between the ROM 3 and the FPGA 2 and provides a connection therebetween. The GA 4 has a function for determining whether or not a startup key code string is correct and a function for booting the user circuit data 24 from the ROM 3 to the FPGA 2. The GA 4 includes a boot control circuit 10, a decryption processing circuit 13, a determination circuit 14, and startup key information 16. The boot control circuit 10 includes a first boot circuit 11 and a second boot circuit 12.

The ROM 3 contains user program data 20 and startup control program data 21. The user program data 20 stores user circuit data 24 and the startup control program data 21 contains authentication circuit data 22 and a startup key code string 23, which is obtained by encrypting a predetermined startup key with a private encryption key.

After the system is powered on, the first boot circuit 11 in the GA 4 is operated to boot the startup control program data 21 in the ROM 3 to the FPGA 2. When the boot is completed, as shown in FIG. 3, an authentication circuit 25 and a startup key code string 26 that has the same code string as the startup key code string 23 are generated in the FPGA 2. The authentication circuit 25 transmits the startup key code string 26 to the GA 4.

The decryption processing circuit 13 in the GA 4 decrypts the transmitted startup key code string 26 and sends a decryption result to the determination circuit 14. The determination circuit 14 performs determination by comparing the decryption result with the predetermined startup key information 15. When the determination circuit 14 determines that they are not the same, the second boot circuit 12 resets the FPGA 2.

When the determination circuit 14 determines that the decryption result and the startup key information 15 are the same, the second boot circuit 12 in the boot control circuit 10 is operated. The second boot circuit 12 boots the user circuit data 24 from the ROM 3. When the boot is completed, user circuit data is generated and stored in the FPGA 2. In accordance with the user circuit data, the logic circuit of the FPGA 2 configures a user circuit 27 desired by the user, as shown in FIG. 4.

FIG. 5 illustrates the operation steps described thus far. In step S-1, the first boot circuit 11 is operated, so that the startup control program data 21, which contains the authentication circuit data 22 and the startup key code string 23, is loaded into the GA 4. Further, in step S-2, the startup control program data 21 is booted to the FPGA 2. When the boot to the FPGA 2 is completed, the authentication circuit 25 is generated in the FPGA 2 in accordance with the authentication circuit data 22 and the startup key code string 23 having the same string as the startup key code string 26 is copied. In step S-3, the generated startup key code string 26 is transmitted to the GA 4.

The decryption processing circuit 13 in the GA 4 decrypts the transmitted startup key code string 26 and sends a decryption result to the determination circuit 14. In step S-4, the determination circuit 14 performs determination by comparing the decryption result with the startup key information 15. In step S-5, the determination circuit 14 sends the determination result to the second boot circuit 12. When the determination result indicates that the decryption result and the startup key information 15 are not the same, in step S-6, the second boot circuit 12 resets the FPGA 2.

When the determination result indicates that the decryption result and the startup key information 15 are the same, in step S-7, the second boot circuit 12 in the boot control circuit 10 requests the ROM 3 to boot the user program data 20. In step S-8, the user program data 20 is booted to the FPGA 2. When the user circuit data 24 is booted, the user circuit data 27 is generated and stored in a RAM (not shown) in the FPGA 2. In accordance with the user circuit data 27, the logic circuit of the FPGA 2 configures the user circuit 27 desired by the user, so that the user circuit 27 starts to operate.

According to this example, the user-specific GA determines whether or not the startup key code string, which is obtained by encrypting a predetermined startup key with a private encryption key, is correct. When the startup key code string is correct, the user circuit data is booted to the FPGA 2 to thereby configure a user circuit in the FPGA 2. When the startup key code string is incorrect, the user circuit data is not booted. That is, only a person who has a user-specific GA with correct startup key information is permitted to operate the system. For any other person, the system does not operate.

SECOND EXAMPLE

Figure 6:
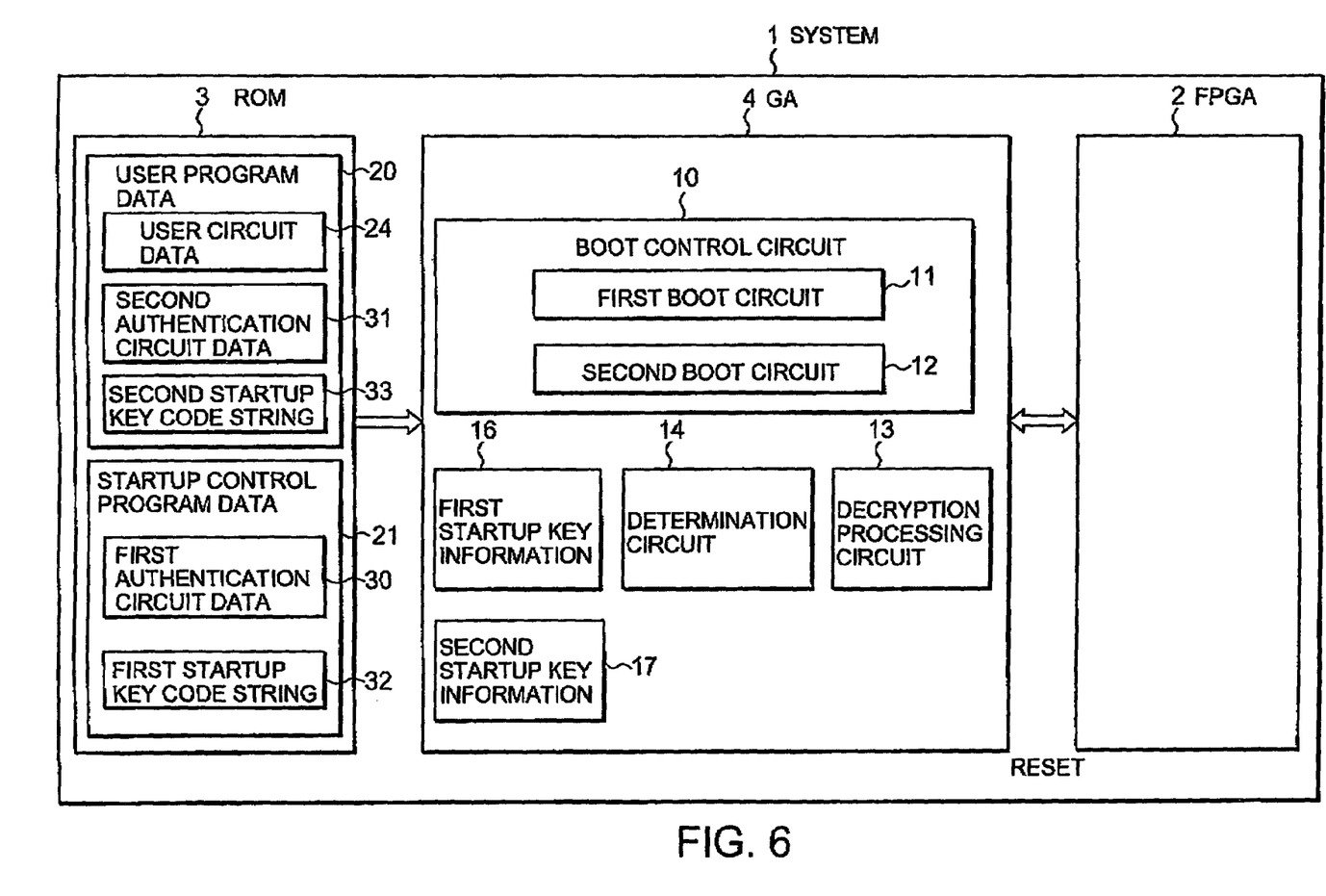
FIG. 6 is a block diagram of a second example of the present invention.
Figure 7:
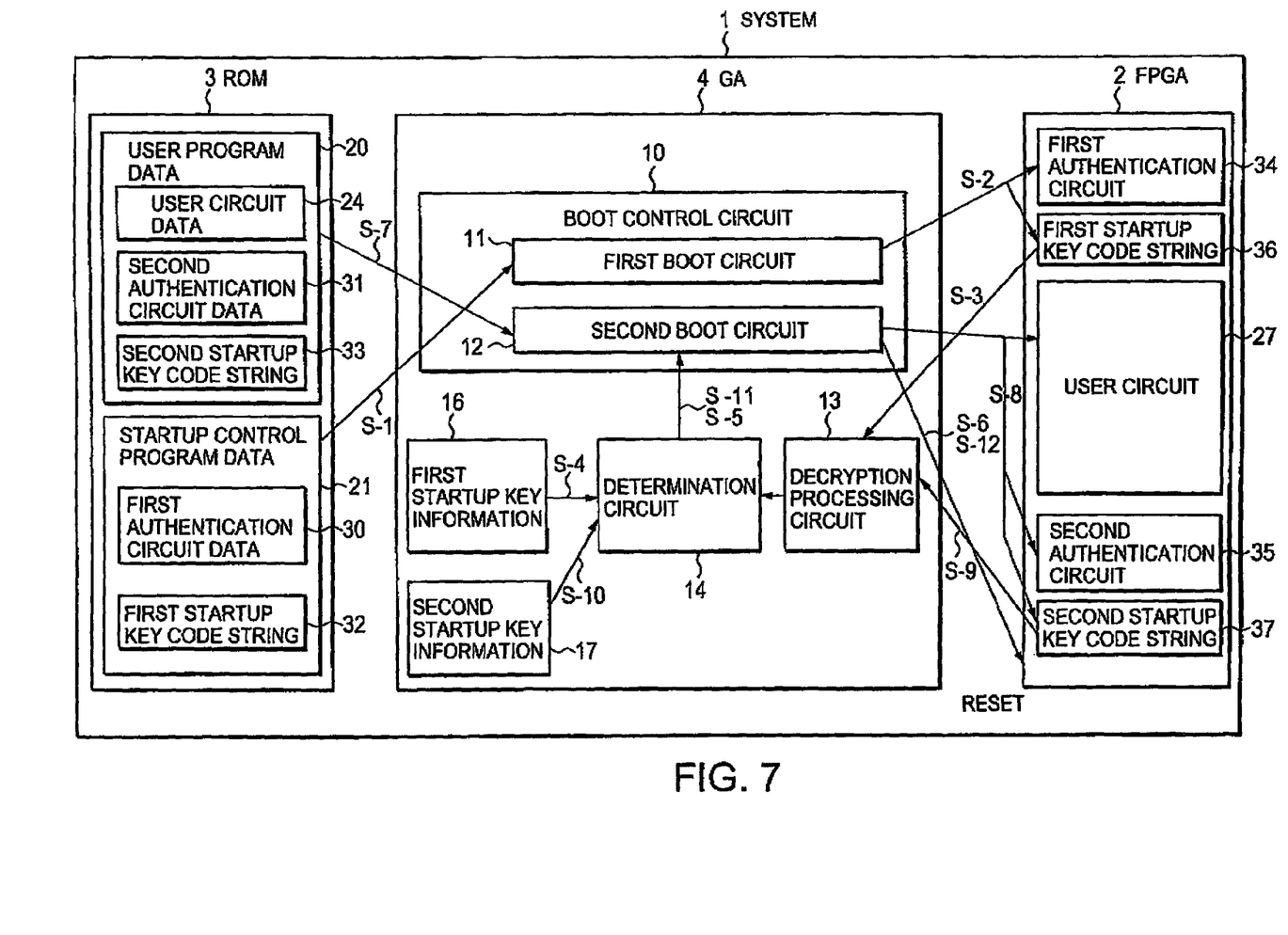
FIG. 7 is a diagram illustrating the operation of the second example.

A second example in which the copy protection function is enhanced will now be described with reference to FIGS. 6 and 7. In this example, the startup key code string in the first example is used as a first startup key code string to perform first determination and a second startup key code string is added to perform second determination, thereby enhancing the copy-protection function. The same blocks as those in the first example are denoted with the same numerals and the descriptions thereof are omitted.

A user-specific GA 4 is pre-programmed at a semiconductor-vendees factory and is disposed between a ROM 3 and an FPGA 2. The GA 4 includes a boot control circuit 10, a decryption processing circuit 13, a determination circuit 14, and predetermined first startup key information 16 and second startup key information 17. The boot control circuit 10 includes a first boot circuit 11 and a second boot circuit 12.

The ROM 3 stores an FPGA program and contains user program data 20 and startup control program data 21. The user program data 20 contains user circuit data 24, second authentication circuit data 31, and a second startup key code string 33 obtained by encrypting a predetermined startup key with a private encryption key. The startup control program data 21 contains first authentication circuit data 30 and a first startup key code string 32 obtained by encrypting a predetermined startup key with a private encryption key.

Using a program, the user can change the internal logic of the FPGA 2 to a user circuit. A first authentication circuit 34, a first startup key code string 36, a user circuit 27, a second authentication circuit 35, and a second startup key code string 37 are generated and configured in the FPGA 2 in accordance with program data from the ROM 3.

The operation will now be described with reference to FIG. 7. Although the authentication circuit, the startup key code string, and the startup key information in the first example are changed to a first authentication circuit, a first startup key code string, and fist startup key information in the operations from steps S-1 to S-6 after the system is powered on, the basic operation of this example is analogous to that in the first example. Thus, the description of the basic operation is omitted.

When the determination result obtained by the determination circuit 14 indicates that the first startup key code string and the first startup key information are not the same, the FPGA 2 is reset in step S-6. When the determination result indicates that they are the same, in step S-7, the second boot circuit 12 in the boot control circuit 10 requests the ROM 3 to boot the user program data 20, thereby loading the user program data 20 into the GA 4. In step S-8, the second boot circuit 12 transmits the user program data to the FPGA 2.

When the boot is completed, the second authentication circuit 35, the second startup key code string 37, and the user circuit 27 based on the user circuit data are generated and configured in the FPGA 2. The user circuit 27 performs operation, and the second authentication circuit 35 transmits the second startup key code string 37 to the GA 4 in step 8-9. The decryption processing circuit 13 in the GA 4 decrypts the second startup key code string 37 and the sends the decryption result to the determination circuit 14. In step S-10, the determination circuit 14 reads the second startup key information 17 and performs determination by comparing the second startup key information 17 with the decryption result of the second startup key code string 37.

In step S-11, the determination circuit 14 sends the determination result to the second boot circuit 12. When the result of the comparison/determination indicates the same startup key, the second boot circuit 12 does nothing. When the result indicates a different startup key, the second boot circuit 12 resets the FPGA 2 in step S-12. When the predetermined second startup key code string 37 is incorrect, the GA 4 resets the FPGA 2 to erase the user circuit 27 and so on even if the user circuit 27 is in operation.

In this example, the user-specific GA 4 determines whether or not the first and second startup key code strings, which are obtained by encrypting predetermined startup keys with private encryption keys, are correct. First, the first startup key code string is determined. When the startup key code string is correct, the user circuit data is booted to the FPGA 2, so that the user circuit is generated and configured in the FPGA 2.

Further, a determination is made as to the second startup key code string. When the second startup key code string is correct, the user circuit is permitted to continue operation. On the other hand, when the first startup key code string is incorrect, the user circuit data is not booted. When the second startup key code string is incorrect, the configured user circuit is erased. That is, only a person who has a user-specific GA with correct first and second startup key code strings is permitted to operate the system. For any other person, the system does not operate. In this example, multiplex determination are performed using the first and second startup key code strings, thereby making it difficult for a person attempting to make an unauthorized copy to analyze the system.

THIRD EXAMPLE

Further, a third example will now be described. The configuration of this example is analogous to that of the second example. The feature of the operation of the third example is that the second authentication circuit 35 generated in the FPGA 2 transmits the startup key code string 37 to the GA 4 at regular intervals or irregular intervals. That is, the operations in steps S-9 to S-12 are repeated after the series of operations in steps S-1 to S-12 in the second example.

More specifically, the operations in steps S-9 to S-12, i.e., the operation of transmitting the startup key code string 37 to the GA 4, the operation of performing determination by comparing the startup key code string 37 with the second startup key information 17, and the operation of resetting the FPGA 2 when the determination indicates unauthorized data, are performed at regular intervals or irregular intervals. The GA 4 performs determination after the decryption and compares the decrypted startup key code string with the startup key information 17, as in the second example. When the comparison result indicates that they are not the same, the FPGA 2 is reset in step S-12. When the decrypted startup key code string is correct, the reset is not performed and thus the user circuit continues to operate. The determination for the reset is performed at regular intervals or irregular intervals.

The number of pieces of startup key information used for the transmission, decryption, and comparison/determination performed at regular intervals or irregular intervals is not limited to two, and thus the types of startup key information can be increased to n that is applicable in practice. Since the second authentication circuit 35 is independent from the user circuit 27, the performance of the user circuit 27 is not affected even when the second authentication circuit 35 repeats the operation for transmission to the GA 4.

In this example, the user-specific GA 4 determines whether or not the first and second startup key code strings, which are obtained by encrypting predetermined startup keys with private encryption keys, are correct. First, the first startup key code string is determined. When the first startup key code string is correct, the user circuit data is booted to the FPGA 2 to configure a user circuit in the FPGA 2. Further, a determination is made using the second key code string. When the second startup key code string is correct, the operation of the user circuit data is continued.

On the other hand, when the first startup key code string is incorrect, the user circuit data is not booted. When the second startup key code string is incorrect, the configured user circuit is erased. Additionally, the determination is repeated, even when the user circuit is in operation. When the second startup key code string is incorrect, the configured user circuit is erased.

As in the third example, only a person who has a user-specific GA with correct first and second startup key code strings is permitted to operate the system. For any other person, the system does not operate. In this example, multiplex determinations are performed using the first and second startup key code strings and the determination using the second startup key code string is repeated even when the user circuit is in operation. This makes it difficult for a person attempting to make an unauthorized copy to analyze the system.

FOURTH EXAMPLE

In addition, a fourth example will now be described with reference to FIGS. 8 and 9. In this example, with respect to the configuration of the second example, respective dummy communication circuits are added to the user program data 20 in the ROM 3, the GA 4, and the FPGA 2.

Figure 8:
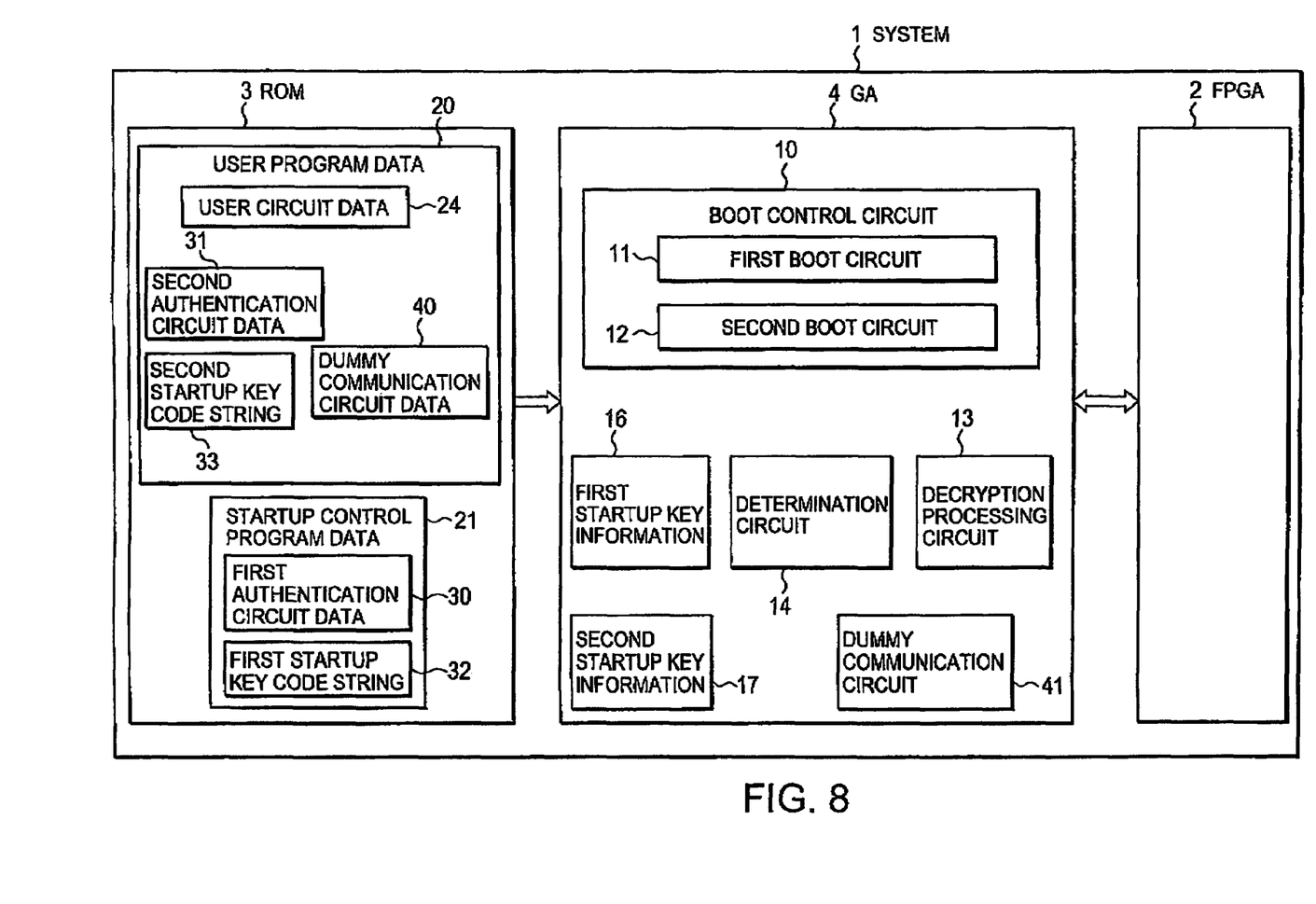
FIG. 8 is a diagram illustrating the operation of a fourth example.
Figure 9:
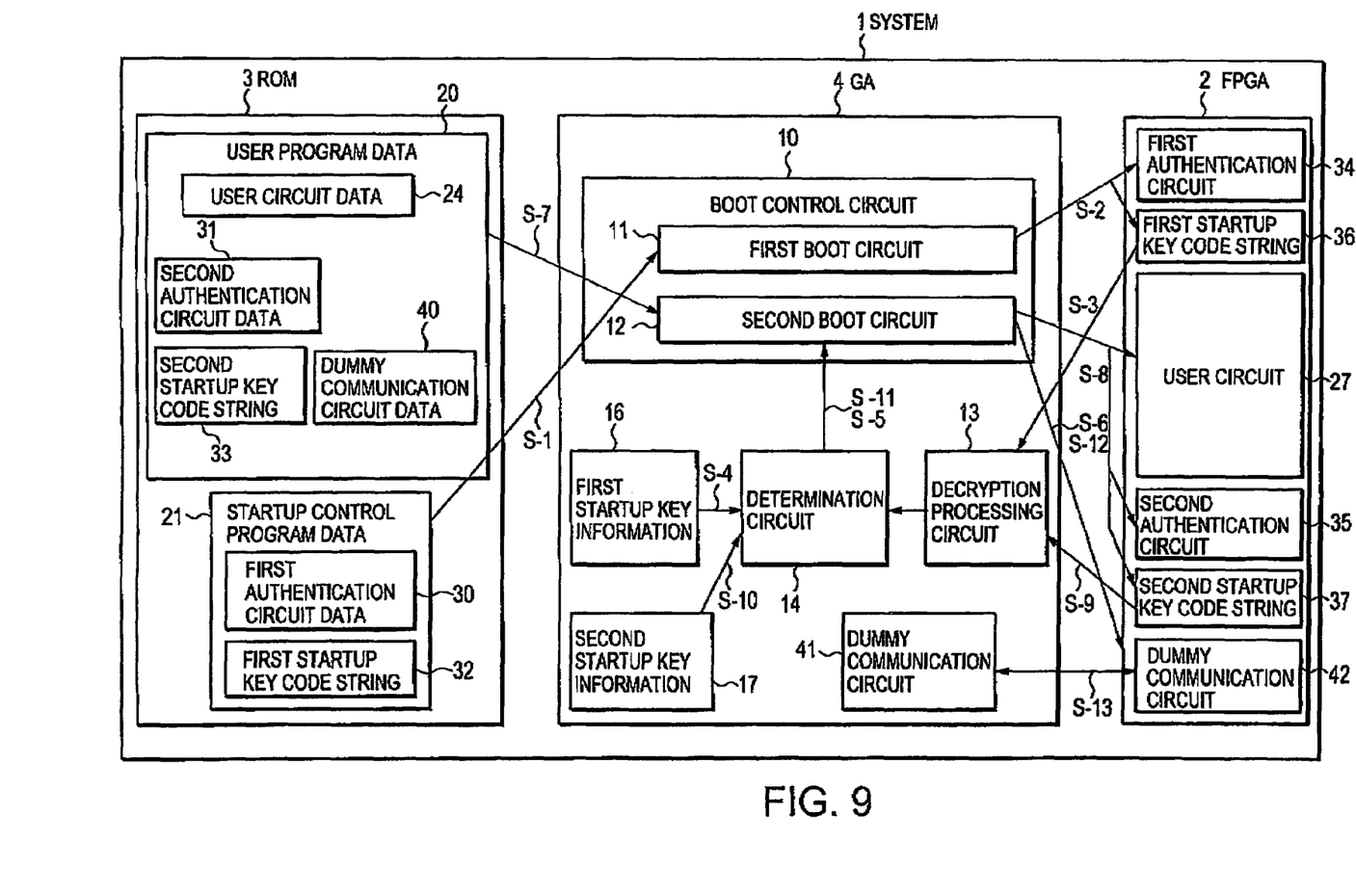
FIG. 9 is a diagram illustrating the operation of the fourth example.

FIG. 8 is a block diagram of the forth example and FIG. 9 illustrates the operation thereof. As shown in FIG. 9, with respect to the operation of the fourth example, the basic operation from steps S-1 to S-12 is analogous to that of the second example and an operation of dummy communication in step S-13 is added. In comparison with the second example, when the user program data is booted to the FPGA 2 in step S-8, a dummy communication circuit 42 is additionally generated in the FPGA 2. The feature of this example is that an operation in step S-13 in which the dummy communication circuit 42 generated in the FPGA 2 communicates with a dummy communication circuit 41 is added in conjunction with the operation of determining the second key code string subsequent to step S-9 upon the operation of the user circuit based on the user program data.

This configuration is aimed to complicate electrical signals connecting between the FPGA 2 and the GA 4 and to make it difficult to perform analysis, for a person attempting to monitor and analyze communication between the FPGA 2 and the GA 4 to fabricate a copy product. The communication is independent from the user-circuit function and the authentication circuit and the algorithm, the number of signals, and timing can be arbitrarily determined.

According to this example, a determination is made as to whether or not the first and the second startup key code strings, which are obtained by encrypting predetermined startup keys with private encryption keys, are correct, to thereby prevent unauthorized copying. In addition, the provision of the dummy communication circuits complicates communication between the FPGA 2 and the GA 4, thereby making it difficult for a person attempting to make an unauthorized copy to analyze the system. Thus, this configuration can protect an unauthorized copy of the system.

FIFTH EXAMPLE

A fifth example is a combination of the third example and the forth example. In the fifth example, the circuit configuration generated in the FPGA 2 after the boot is completed in step S-8 is analogous to that in the forth example (FIG. 9). In the operation of the fifth example, in addition to the operations in steps S-1 to S-13 in the forth example, the operation of transmitting the second startup key code string 37 in steps S-9 to S-12 at regular or irregular intervals and the operation of performing determination are performed in parallel upon the dummy communication in step S-13.

In the operation of the fifth example, when the user circuit is generated in the FPGA 2 and is operated, the dummy communication circuit 42 in the FPGA 2 communicates with the dummy communication circuit 41 in the GA 4. Additionally, the second authentication circuit 35 transmits the second startup key code string 37 to the GA 4 at regular or irregular intervals. The GA 4 performs decryption processing and determination processing at regular or irregular intervals. When the decrypted startup key is not the same as predetermined startup key information, the GA 4 resets the FPGA 2 even if the user circuit is in operation.

According to this example, a determination is made as to whether or not the first and the second startup key code strings, which are obtained by encrypting predetermined startup keys with private encryption keys, are correct, to thereby prevent unauthorized copying. In addition, the determination using the second startup key code string is repeated and the dummy communication circuits are further provided, thereby complicating communication between the FPGA 2 and the GA 4. This makes it difficult for a person attempting to make an unauthorized copy to analyze the system, thereby protecting an unauthorized copy of the system.

SIXTH EXAMPLE

Figure 10:
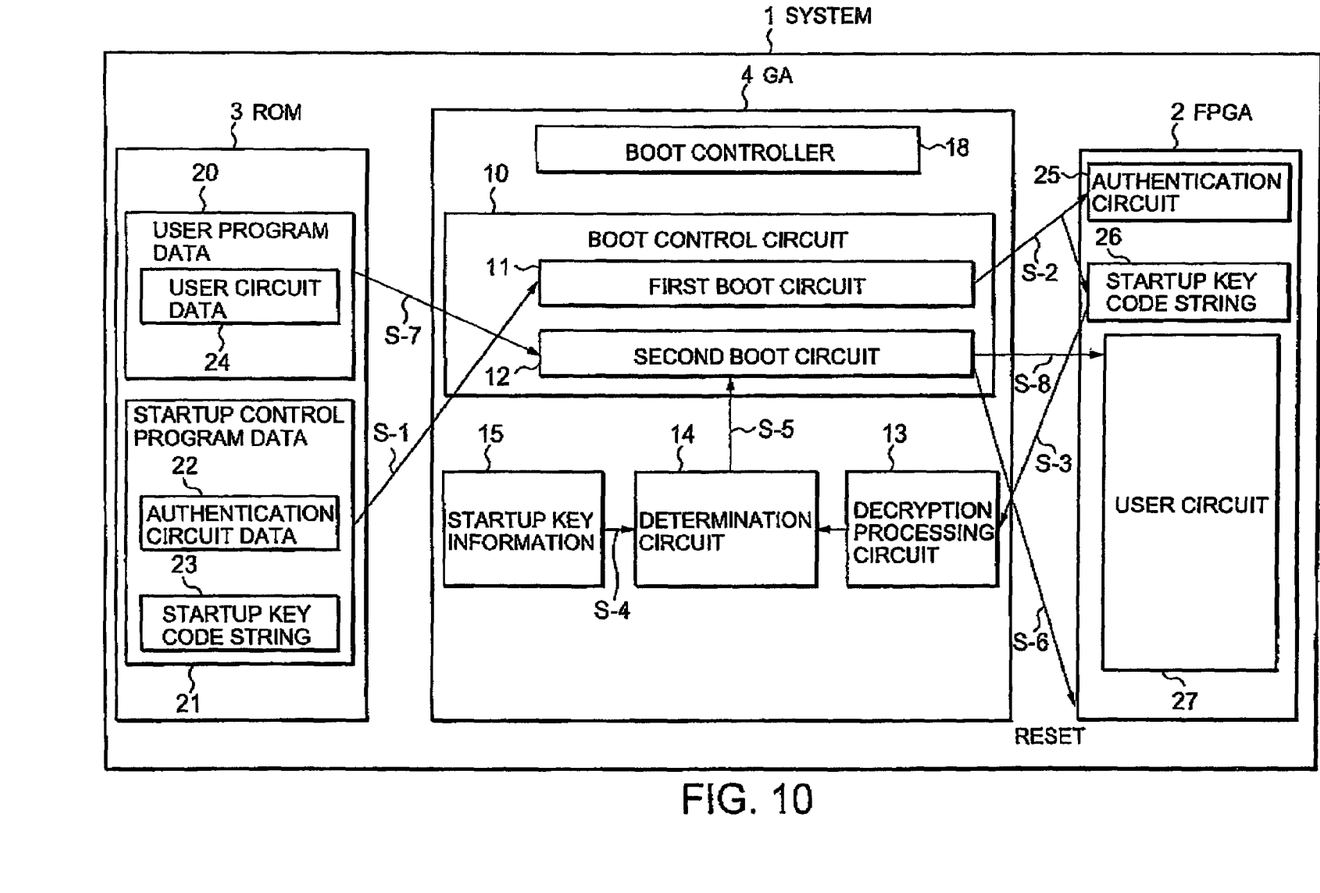
FIG. 10 is a diagram illustrating the operation of a sixth example.

A six example will now be described. The configuration of the sixth example is different from that of the first example in that the GA 4 has a boot controller circuit 18 having a boot controller function, and other configurations are analogous to those of the first example. FIG. 10 shows an operation when the boot controller circuit 18 is added to the first example.

The boot controller circuit 18 controls the power on/off sequence, address control, program conversion, and so on for the system 1, when required. In FIG. 10, under the control of the boot controller circuit 18, power is sequentially turned on and, under the control of the boot controller circuit 18, power is sequentially turned off.

Since the operations of the ROM 3, the GA 4, and the FPGA 2 after power is sequentially turned on and before power is turned off under the control of the boot controller circuit 18 are the same as the operations in steps S-1 to S-8 in the first example, the descriptions thereof are omitted. As in the first example, the operation steps S-1 to S-8 in the sixth example can also prevent unauthorized copying of the user circuit data.

In this example, the boot controller circuit 18 is incorporated into the GA, and the power-on sequence, the program conversion function, and so on are made user-specific. This arrangement can make it difficult to even turn on power for unauthorized copying, thereby allowing the configuration of a system that can enhance unauthorized-copy protection.

Although the boot controller circuit 18 is added to the GA 4 in the first example, naturally, the boot controller circuit 18 is also applicable to the other second to fifth examples.

SEVENTH EXAMPLE

Figure 11:
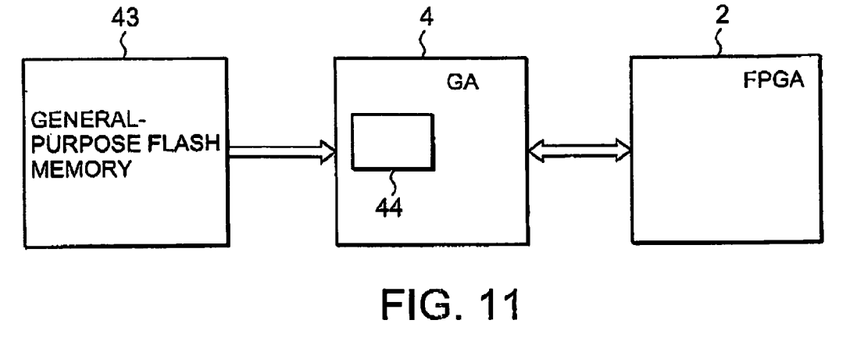
FIG. 11 is a diagram illustrating the operation of a seventh example.

A Seventh example will now be described with reference to FIG. 11. In this example, the ROM described above is replaced with a flash memory 43, the flash memory is used as a memory device. The configuration of a GA 4 in this example is analogous to the configuration of the GA 4 shown in FIG. 2 (but not shown in FIG. 11) and further has a data converter 44.

The operation of this example will be described below. The operation is analogous to that of the first example. That is, the series of operations, such as the loading of the startup control program 21 into the GA 4, the booting to the FPGA 2, the generation of the authentication circuit 25 in the FPGA 2, the transmission of the startup key code string 26 to the GA 4, and the comparison/determination performed by the GA 4, are performed as in the first example. The feature of this example is that the data converter 44 is added to the GA 4. Since the general-purpose flash memory is designed for a general application, the data bus and the address bus are pre-defined. The data converter 44 converts address data and data between the GA 4 and the general-purpose flash memory 43 so that the general-purpose flash memory 43, the boot control circuit 10 in the GA 4, and so on shown in the first example can be connected. Various general-purpose flash memory products are available from venders and the GA 4 is a custom LSI product. Thus, when the connection between the GA 4 and the general-purpose flash memory 43 can be ensured, the data converter 44 can be eliminated.

In this example, the ROM 3 is replaced with a general-purpose flash memory. The use of a general-purpose flash memory can also provide a copy protection method and a system which prevent unauthorized copying.

EIGHTH EXAMPLE

Figure 12:
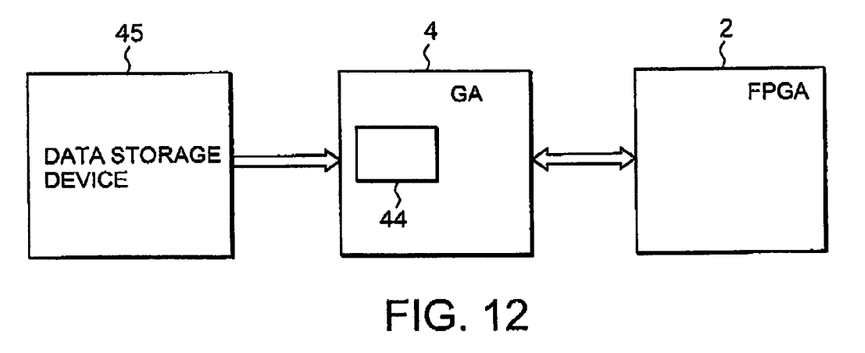
FIG. 12 is a diagram illustrating the operation of an eighth example.

An eight example will now be described with reference to FIG. 12. In this example, the ROM is replaced with a data storage device 45, the storage device is used as a memory device. Examples of the data storage device 45 include a minidisk or an optical disk. The configuration of a GA 4 in this example has the same configuration (not shown in FIG. 12) as the GA 4 shown in FIG. 2 and further has a data converter 44.

The operation of this example will be described below. The operation is analogous to that of the seventh example. That is, the series of operations, such as the loading of the startup control program 21 into the GA 4, the booting to the FPGA 2, the generation of the authentication circuit 25 in the FPGA 2, the transmission of the startup key code string 26 to the GA 4, and the comparison/determination performed by the GA 4, are performed. The feature of this example is that the data converter 44 is added to the gate GA 4. The data converter 44 is provided so that the data storage device 45, the boot control circuit 10 in the GA 4, and so on shown in the first example can be connected. Various data storage device products are available from venders and the GA 4 is a custom LSI product. Thus, when the connection between the GA 4 and the data storage device 45 can be ensured, the data converter 44 can be eliminated.

In this example, the ROM 3 is replaced with a data storage device. The use of a data storage device can also provide a copy protection method and a system which prevent unauthorized copying.

In this invention, as a memory device which contains user program data and startup control program data, a ROM, a flash memory and a data storage device are used. A memory device is not limited to these examples, and the other devices which can store program data are usable as memory device.

Although the present invention has been described in conjunction with the specific examples, the present invention is not limited to the examples and various changes are possible thereto without departing from the spirit and scope of the present invention. For example, a plurality of FPGAs can be provided on the system, a plurality of FPGAs and ROMs may be provided, or a single GA or a plurality of GAs may be provided.

What is claimed is:

1. A copy protection method for a field-programmable gate array including a first circuit being connected to the field-programmable gate array and a memory device in which a user circuit data and a first startup key code string are stored, the method comprising:

determining, in the first circuit, a determination result by comparing a decryption result of the startup key code string with a first startup key information which is pre-programmed;

when the determination result is correct, causing the first circuit to boot the user circuit data to the field-programmable gate array;

when the determination result is incorrect, causing the first circuit to reset the field-programmable gate array;

booting, in the first circuit, a startup control program data which contains the first startup key code string and a first authentication circuit data to the field-programmable gate array; and decrypting, by the first circuit, the first startup key code string transmitted from the field-programmable gate array, wherein when the determination result is correct, the first circuit boots the user circuit data to the field-programmable gate array to generate a user circuit, decrypts a second startup key code string transmitted from the field-programmable gate array, and determines a second determination result by comparing a decryption result of the second startup key code string with a second startup key information; and when the second determination result is correct, the first circuit causes an operation of the user circuit to continue, and when the determination result is incorrect, the first circuit resets the field-programmable gate array, wherein the first circuit comprises a user-specific gate array.

2. The copy protection method according to claim 1, further comprising:

transmitting the second startup key code string from the field-programmable gate array to the first circuit at regular or irregular intervals, wherein the first circuit decrypts the transmitted second startup key code string and determines a third determination result by comparing a decryption result of the transmitted second startup key code string with the second startup key information; and when the third determination result is correct, the first circuit causes an operation of the user circuit to continue, and when the third determination result is incorrect, the first circuit resets the field-programmable gate array.

3. The copy protection method according to claim 1, wherein the first circuit further comprises a dummy communication circuit to communicate with a dummy communication circuit generated in the field-programmable gate array.

4. The copy protection method according to claim 1, wherein the first circuit functions as a boot controller.

5. The copy protection method according to claim 1, wherein, with respect to a plurality of field-programmable gate arrays, the first circuit controls the boot of the user circuit data or an operation of a user circuit.

6. The copy protection method according to claim 1, further comprising:

causing the first circuit to transmit a startup control program data from the memory device to the field-programmable gate array;

causing the field-programmable gate array to transmit the startup key code string to the first circuit;

causing the first circuit to compare a startup key code string which is stored with the startup key code string transmitted from the field-programmable gate array;

causing the first circuit to permit whether to boot, or not to boot the user circuit data to the field-programmable gate array according to a comparison result.

7. The copy protection method according to claim 1, wherein when the determination result is correct, the first circuit boots a second startup key code string and a second authentication circuit data to the field-programmable gate array, decrypts the second startup key code string transmitted from the second authentication circuit which is configured in the field-programmable gate array, and determines a second determination result by comparing a decryption result of the second startup key code string with a second startup key information which is pre-programmed in the first circuit;

when the second determination result is correct, causing the first circuit to boot the user circuit data to the field-programmable gate array; and when the determination result is incorrect, causing the first circuit to reset the field-programmable gate array.

8. A system comprising:

a field-programmable gate array;

a memory device that stores a user circuit data and a control program data that includes a first startup key code string and a first authentication circuit data; and a first circuit connected to the memory device and the field-programmable gate array, wherein the first circuit comprises:

a first startup key information that is pre-programmed;

a determination circuit that determines a determination result by comparing a decrypted first startup key code string with the first startup key information;

a first boot circuit that receives the determination result from the determination circuit, wherein when the determination result is incorrect, the first boot circuit resets the field-programmable gate array, and when the determination result is correct, the first boot circuit boots the user circuit data to the field-programmable gate array;

the memory device further comprises a second startup key code string and a second authentication data;

the first circuit comprises a second startup key information compared with a decryption result of the second startup key code string transmitted from the field-programmable gate array, wherein when the determination result is correct, the first boot circuit boots the second key code string and the second authentication circuit date to the field-programmable gate array, the decryption processing circuit decrypts the second startup key code string transmitted from the field-programmable gate array, and the determination circuit determines a second determination result by comparing the decrypted second startup key code string with the second startup key information, when the second determination result is correct, the first boot circuit boots the user circuit date to the field-programmable gate array, and when the determination result is incorrect, the first boot circuit resets the field-programmable gate array, wherein the first circuit comprises a user-specific gate array.

9. The system according to claim 8, wherein the first circuit comprises:

a second boot circuit that boots the first key code string and the first authentication circuit data to the field-programmable gate array; and a decryption processing circuit for decrypting the first startup key code string transmitted from the field-programmable gate array.

10. The system according to claim 8, wherein the first circuit further comprises a dummy communication circuit for communicating with a dummy communication circuit generated in the field-programmable gate array.

11. The system according to claim 8, wherein the first circuit further comprises a boot controller.

12. The system according to claim 8, wherein the field-programmable gate array comprises a plurality of field-programmable gate arrays.

13. The system according to claim 8, wherein the memory device comprises a read-only memory.

14. The system according to claim 8, wherein the memory device comprises a flash memory.

15. The system according to claim 8, wherein the memory device comprises a data storage device.

* * * * *